May 15, 1962  B. F. BREGI  3,034,219
GEAR CHECKING APPARATUS
Filed June 6, 1955  2 Sheets-Sheet 1

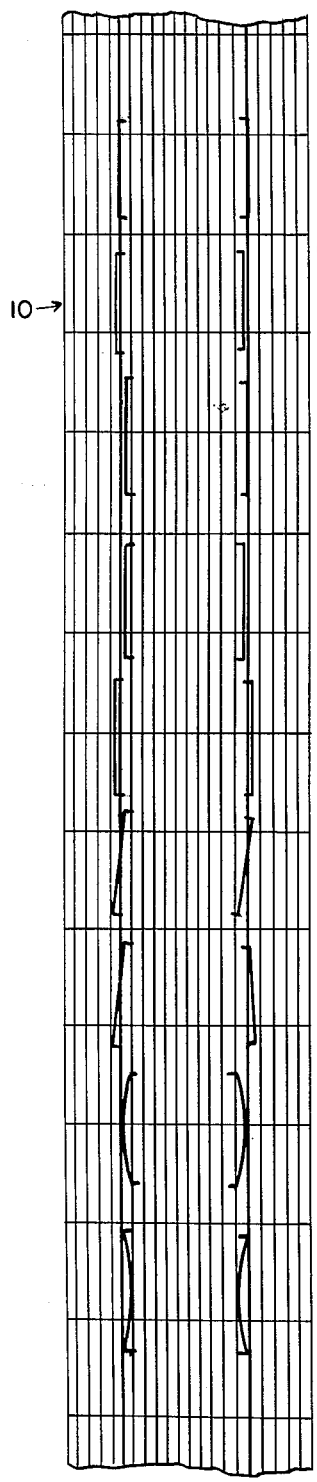

TYPICAL CHART
INTERPRETATIONS

PERFECT TOOTH
LEAD SPACING &
THICKNESS CORRECT

CORRECT LEAD &
THICKNESS
SPACING ERROR..0001

THIN TOOTH
LEFT SIDE
.0001 THIN

THIN TOOTH
BOTH SIDES
.0001 THIN

THICK TOOTH
BOTH SIDES

TOOTH
OFF ANGLE .0002

TAPERED TOOTH
.0002 THICK AT CENTER
CENTER

CROWNED TOOTH
.0002 THICK AT
CENTER

HOLLOW TOOTH
.0002 HOLLOW
AT CENTER
EACH SIDE

FIG.1.

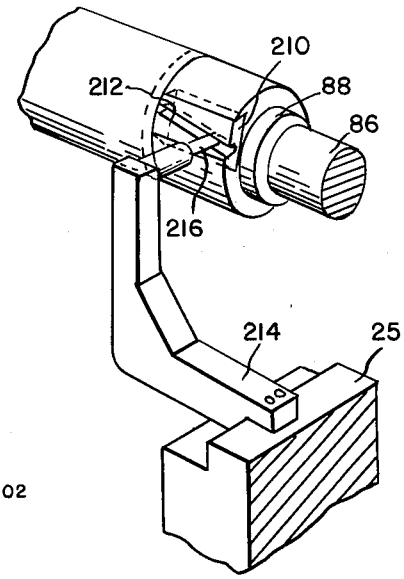

FIG.3.

INVENTOR.
BENJAMIN F. BREGI
BY Whittemore,
Hulbert & Belknap
ATTORNEYS

May 15, 1962 B. F. BREGI 3,034,219
GEAR CHECKING APPARATUS
Filed June 6, 1955 2 Sheets-Sheet 2

INVENTOR.
BENJAMIN F. BREGI
BY Whittemore,
Hulbert & Belknap
ATTORNEYS

United States Patent Office 3,034,219
Patented May 15, 1962

3,034,219
GEAR CHECKING APPARATUS
Benjamin F. Bregi, Grosse Pointe Park, Mich., assignor to National Broach & Machine Company, Detroit, Mich., a corporation of Michigan
Filed June 6, 1955, Ser. No. 513,433
3 Claims. (Cl. 33—179.5)

The present invention relates to gear checking apparatus, and more particularly, to an instrument designed to automatically check each tooth of a gear from end-to-end and to record the results of such tooth check on a chart.

It is an object of the present invention to provide a fully automatic gear checking apparatus designed after placement of a gear thereon to effect a sequential check of each tooth of the gear, to produce a chart showing the results of such checking, and to terminate its operation automatically upon completion of the check of the tooth.

It is a further object of the present invention to provide gear checking apparatus to effect a simultaneous checking of opposite sides of a single gear tooth and to carry out such check sequentially upon all teeth of a gear.

It is a further object of the present invention to provide a gear checking instrument designed to check both sides of each tooth of a gear and to produce a chart showing the results of such check, the chart indicating tooth thickness, tooth spacing both tooth-to-tooth and cumulative tooth spacing, tooth angle, tapered teeth, crowned teeth, and hollow teeth.

More specifically, it is an object of the present invention to provide a gear checking instrument comprising a support for a work gear, a checking device including a pair of relatively movable elements engageable simultaneously with opposite sides of the same tooth of the gear, means for effecting relative reciprocation between the gear support and the checking device, and means for effecting relative indexing motion between the gear and device between gauging strokes.

It is a further object of the present invention to provide a gear checking instrument as described in the preceding paragraph in which means are provided for effecting relative movement between the gear and device in a direction radial of the gear to provide for relative traverse between the device and gear in one direction without effecting a gauging operation.

It is a further object of the present invention to provide an instrument as described in the preceding paragraphs in combination with automatic recording means.

It is a further object of the present invention to provide a gear gauging instrument including means for effecting relative reciprocation in a gauging and idle stroke between a gear and gauging device, and means for advancing a record chart beneath a recording device in timed relation to relative reciprocation between the gear and device during the gauging stroke only.

It is a further object of the present invention to provide an automatic recording gauge comprising means for effecting relative reciprocation between a gear support and gauging device, and means directly responsive to such relative reciprocation for feeding the record chart so that the record on the chart bears a definite relationship to the dimension along the gear teeth in which the checking operation takes place.

It is a further object of the present invention to provide a gear checking instrument designed to effect rapid and accurate checking of both sides of all of the teeth of a gear, either helical or spur, and to produce an accurate record chart of the results of the checking operation.

Other objects and features of the invention will become apparent as the description proceeds, especially when taken in conjunction with the accompanying drawings, wherein:

FIGURE 1 is a view of a typical chart showing different results recorded as a result of the checking operation of the instrument disclosed herein.

FIGURE 3 is a fragmentary perspective view of structure added to the instrument shown in FIGURE 2 adapting it to the checking of helical gears.

Figure 2:
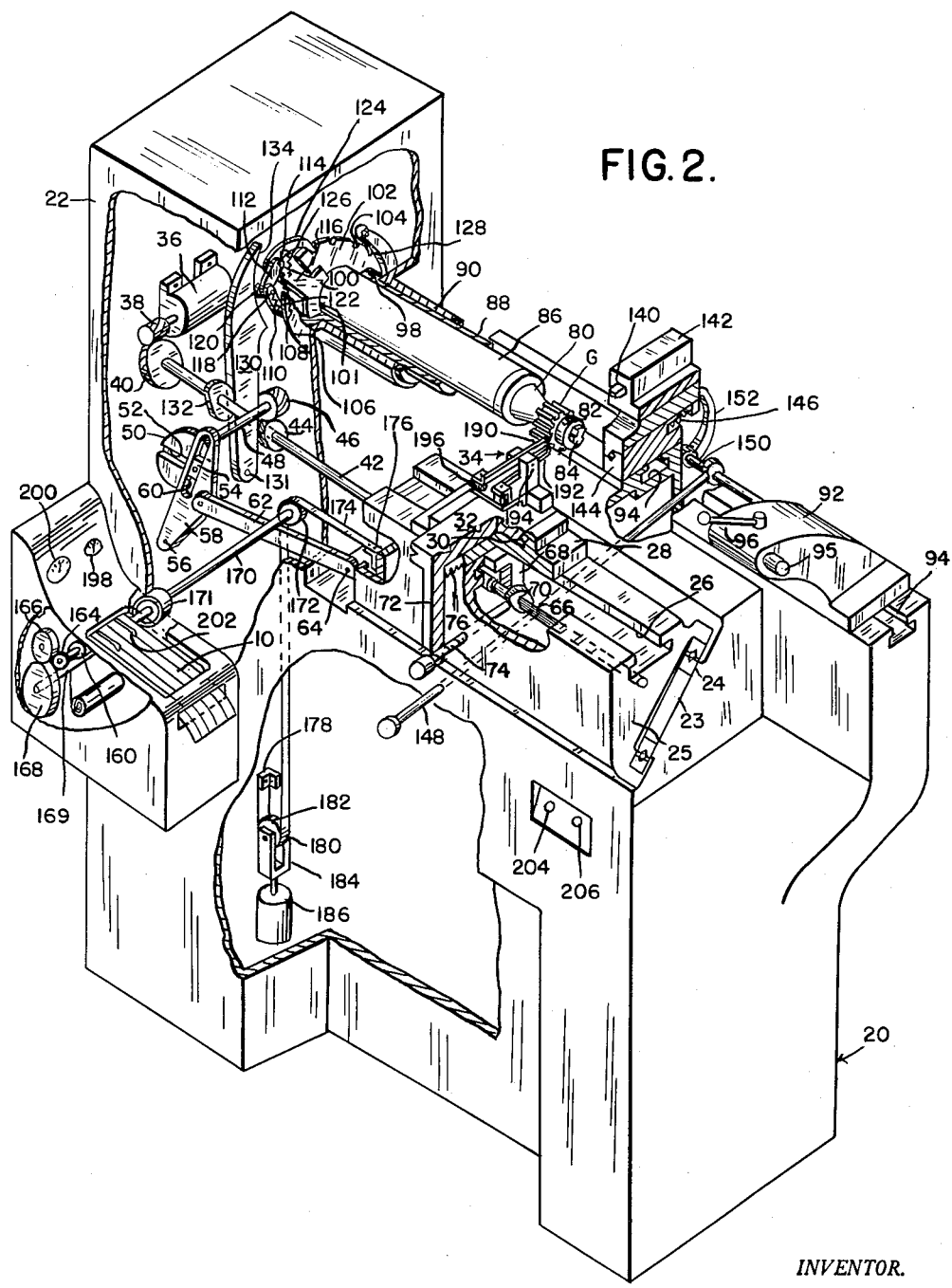
FIGURE 2 is a perspective view with parts broken away of the complete gear checking instrument.

Referring now to FIGURE 1 there is illustrated the chart 10 having thereon typical representations of the record made by the operation of the present gear checking instrument, together with labels indicating the gear characteristic shown by the chart of the several teeth.

Referring now to FIGURE 2, the gear checking instrument comprising a main base 20 which may be a casting or which may be fabricated as desired. The base 20 includes an upstanding housing portion 22 in which the drive motor, drive mechanism, and indexing mechanism is received. The base 20 comprises a bed portion provided as illustrated with an inclined seat 23 adapted to receive longitudinally extending bearing means indicated generally at 24 for a longitudinally movable main slide 25. At its top the slide 25 is provided with a longitudinally extending T-slot 26 in which is adjustably received intermediate slide 28. The intermediate slide 28 is provided with a transversely extending grooved seat 30 in which is supported a transverse slide 32. Carried by the transverse or cross slide 32 is a checking device indicated generally at 34 which will subsequently be described in detail.

Located within the housing portion 22 of the base 20 is a motor 36 having a worm 38 connected to its drive shaft and meshing with a worm gear 40 secured to the main drive shaft 42. The main drive shaft 42 has thereon a gear 44 meshing with a second gear 46 carried by a shaft 48 extending at right angles to the main drive shaft 42. The shaft 48 carries a variable stroke crank 50 having a groove 52 in which the driving element 54 of the crank is longitudinally adjustable to vary the stroke. Pivoted to the base at 56 is a lever 58 having a slot 60 in which the element 54 is longitudinally reciprocable. Pivoted intermediate the ends of the lever 56 is a link or connecting rod 62 which is pivotally connected to the main slide 25 as indicated at 64. From the foregoing it will be observed that the main slide 25 is reciprocated back and forth in a complete forward and return stroke once during each rotation of the crank. The right angled drive gears 44 and 46 are of equal size and accordingly the main slide 25 makes a complete reciprocation once during each rotation of the main drive shaft 42.

The portion of the main drive shaft 42 which extends within the hollow interior of the main slide 25 is splined as indicated at 66. Extending into the interior of the main slide 25 and fixedly secured to the intermediate slide 28 is a cam support 68 to which is journaled the cross slide cam 70, this cam being splined to the spline portion 66 of the main drive shaft 42. The cross slide 32 is provided with a depending portion 72 carrying a threaded cam abutment screw 74 the inner end of which engages the surface of the cam 70. Suitable spring means indicated diagrammatically at 76 bias the cross slide 32 in such a direction as to maintain the end of the cam abutment screw 74 in contact with the surface of the cam.

With the foregoing construction it will be observed that the intermediate slide 28 may be adjusted longitudinally of the main slide to position the cross slide and the gauging device carried thereby in proper position relative to any particular work gear. With this adjustment accomplished, the adjustable cam abutment screw 74 is adjusted to move the cross slide to the proper operating position. Thereafter, depending on operation of the instrument, the cross slide 32 is cammed radially of the shaft of the gear being gauged in a cycle completed once during each revolution of the main drive shaft 42. Thus, in the normal operation of the instrument, the cross slide 32 may remain in gauging position during a working stroke of the instrument and may then be cammed radially away from the gear to provide an idle stroke in which the sensing elements of the gauging device do not contact the teeth of the work gear.

The work gear indicated at G is shown as supported on a stub arbor 80 and may conveniently be retained thereon by a lock nut 82 of the quarter turn type engaged on the threaded end 84 of the arbor. The arbor is rigidly secured to the work spindle 86 which is rotatably received within quill 88 which is fixedly received within a tubular projection 90 of the housing or headstock portion 22 of the base. If desired, and as dictated by the particular gear being checked, a tailstock 92 is provided which may in turn carry a live center for engagement with a gear or gear supporting fixture. The tailstock 92 is longitudinally adjustable along ways 94 provided on the bed of the base and may be clamped in operating position. Center 95 may be operated through a lever 96.

In order to effect indexing of the work gear once during each complete forward and reverse stroke of the gauging device, the quill 88 is provided with an annular groove 98 in which is rotatably received a circular part 100 of a movable support element 101. The spindle 86 has rigidly secured to its inner end an index plate 102 provided with accurately formed index notches 104. The quill 88 includes a radially extending flange 106 located within the headstock portion of the casting and pivoted to the flange 106 as indicated at 108 is one link 110 of a toggle device, the other link of which is indicated at 112. Link 112 is pivoted as indicated at 114 to an arm 116 extending radially from the circular part 100 of the movable support element 101. The inner ends of the toggle links 110 and 112 are pivotally connected by a pivot pin 118, which pin carries a roller 120. A tension spring indicated generally at 122 is provided tending to cause the axes of pivot connections 108 and 114 to approach.

Pivoted to the arm 116 is a feeding pawl 124 having a spring 126 urging the pawl into engagement with the peripheral surface of the index plate 102. Pivoted to the flange 106 of the quill 88 is a locking or locating pawl 128 having a portion adapted to fit snugly within a recess in the index plate and so to locate the work spindle in accurately indexed position.

This indexing mechanism is operable by an actuating lever 130 which is pivoted as indicated at 131 to suitable means on the main base. Rigidly connected to the drive shaft 42 is an indexing cam 132 the periphery of which engages a side of the index lever 130. The lever 130 is provided with an arcuate surface 134 to enable the indexing operation to be carried out while checking helical gears, as will subsequently be described. It is sufficient to note, for the time being, that the arcuate surface 134 is concentric with the axis of the work spindle 86 and has an angular extent sufficient to remain in engagement with the roller 120 during the angular movement of the parts necessitated when checking a helical gear.

The indexing operation is carried out once during each rotation of the main drive shaft 42. Movement of the lever 130 in a clockwise direction straightens out the toggle comprising links 110 and 112 and thus rocks the support element 101 about the axis of the work spindle. Motion is transmitted to the work spindle through the feed pawl 124 and the index plate. This movement results in forcing the locking and locating pawl 128 out of a recess of the index plate. Suitable spring means are of course provided for biasing the locking pawl 128 into contact with the peripheral surface of the index plate. As the lever 130 is allowed to move in a counterclockwise direction, the locking or locating pawl 128 drops into the appropriate index recess and the feed pawl rides out of a notch and moves over the peripheral surface of the index plate into the next succeeding notch.

Means are provided for locating the gear G accurately with reference to the index plate 102 when it is first mounted on the instrument. To accomplish this a locating tooth 140 is provided on a slide 142 movable in a direction perpendicular to the axis of the gear G on a block 144 which is adjustable along the T-slot 94 previously referred to. The tooth 140 is adapted to fit within a tooth space on the gear G and to hold the gear in proper angular relationship while the nut 82 is tightened. Spring means indicated at 146 bias the slide 142 radially outwardly on the block 144 with respect to the gear G. Manually operated means are provided for moving the slide 142 toward the gear and comprise an operating lever 148 extending to the front of the machine and adapted to be depressed to rotate a shaft 150 carrying a second lever 152 the end of which is engageable with the slide 142. With this construction the operator is required to depress the lever 148 and to hold it depressed while locking the work gear G in position. Upon release of the lever, the spring 146 retracts the tooth 140 from the work gear. Preferably, a suitable limit switch actuated by retraction of the slide 142 is also provided to prevent initiation of automatic operation of the instrument unless the slide is retracted to a position in which the tooth 140 will not interfere with indexing rotation of the gear G.

In order to provide a record chart which shows the true condition of the gear with respect to its characteristics as determined by the present instrument, suitable recording means are provided. The recording means comprises means for advancing the chart 10 in timed relation to advance of the gauging device in its gauging stroke. Inasmuch as the reciprocating movement of the main slide 25 is the result of crank action, it will be apparent that the velocity of the slide is non-uniform. In order that the charted representation of the gear tooth shall be comparable point by point to longitudinally spaced points on the gear tooth, it is essential that the chart be advanced in definitely timed relation to the movement of the gauging device. This is accomplished in the present instance by advancing the elongated tape-like chart by one or more feeding rolls 160 carried by a shaft 162 and driven through gears 164, 166 and 168 from a shaft 169. The shaft 169 is coupled to a drive shaft 170 by a one-way clutch device 171. The shaft 170 has rigidly secured thereto a friction roller 172 fixedly secured thereto. Over the friction roller 172 is a friction tape 174, one end of which is fixed to the main slide as indicated at 176. The other end of the tape is fixedly secured to the base of the machine by a bracket indicated at 178, the tape forming a bight or loop 180 in which is received a roller 182 connected to a bracket 184 from which is suspended a counterweight 186. With this arrangement forward movement of the slide 25 on a gauging stroke draws the friction tape 174 over the roller 172, turning the shaft 170 and the driving element of the one-way clutch 171 in a clockwise direction. This rotation of the shaft 170 is thus transmitted directly to the shaft 169 and hence results in a feeding or advancing movement of the record chart which is a direct function of the advancing or gauging movement of the slide 25. Due to the provision of the one-way clutch, the idle or reverse stroke of the slide 25 does not result in rearward rotation of the shaft 162.

The gauging device indicated generally at 34 comprises a pair of sensing elements or fingers 190 and 192 which are pivoted on axes determined by pivot pins 194 for rocking movement as the tips of these fingers are moved longitudinally of the teeth of the gear G. The rear ends of the fingers 190 are associated with core elements movable longitudinally of windings of lineal transformers indicated diagrammatically at 196. Lineal transformers used as sensitive measuring elements are well known and operate to vary current in an electric control circuit. In the present instance, variations in current in the windings of the lineal transformers are caused to actuate indicating needles 198 movable over dials indicated at 200, and also to actuate recording pens or needles 202 movable over the advancing elongated chart 10.

From the foregoing it will be observed that so long as the motor 36 is energized, the slide 25 will reciprocate back and forth and once during each reciprocation the gear G will be indexed one tooth space. At the same time, during each forward stroke of the gauging device 34, the recording chart 10 will be advanced proportionately to the advance of the slide and a permanent record produced on the chart by the movement of the pens 202 in accordance with movement of the sensing fingers 190. The motor 36 thus mechanically effects reciprocation of the slide 25 and by cam means effects movement of the gauging device into and out of operating position and indexing of the work spindle while the gauging device is out of contact with the gear. At the same time, movement of the slide is employed as the actuating force for advancing the chart.

In order that the instrument may be fully automatic it is provided with an electrical circuit controlled by start and stop buttons 204 and 206. The circuit is not illustrated herein since it may be conventional except that it includes means responsive to the position of the locating tooth 140 to prevent energization of the motor 36 so long as the finger 190 is engaged in a tooth of the gear G. Otherwise, the circuit includes a counting device which may be manually set to interrupt the circuit after a predetermined number of strokes of the slide 25. Obviously, the counting device will be set to correspond to the number of teeth of the gear so that after all teeth have been accurately gauged, the motor 36 stops.

Referring now to FIGURE 3 there is illustrated means for converting the instrument shown in FIGURE 2 for operation in conjunction with helical gears. In this case the quill 88 is rotatable in the headstock. The work spindle 86 is rotatable in the quill. Mounted on the quill is a helical compensating member 210 provided with a helically extending groove 212 thereon corresponding to the helix of the teeth of the gear to be gauged.

Rigidly mounted on the main slide 25 is a bracket 214 having a finger 216 adapted to engage in the helical groove 212. With this arrangment back and forth reciprocation of the main slide 25 results in a corresponding back and forth angular movement of the quill 88.

The indexing structure employed is exactly as illustrated in FIGURE 2. It will be appreciated that with this arrangement angular movement of the quill 88 is transmitted to the index plate 102 through the locking pawl 128. Furthermore, indexing is accomplished by rotation of the movable support element 101. The angular extent of the surface 134 of the index lever 130 permits the indexing operation to take place during the return or idle stroke of the plate even though during such return or idle stroke the quill 88 is being rotated by engagement between the fingers 216 and the helical slot 212.

While the sensing elements or fingers 190 and 192 may be adjustable, it is contemplated that the entire sensing device 34 will be replaceable as a unit and designed for a particular gear G. At the same time, it will be understood that the electrical circuit including the lineal transformer employed as amplifying means for movement of the sensing fingers includes means for effecting adjustments to zero to indicating pointers 198 and the recording pins or needles 202.

The drawings and the foregoing specification constitute a description of the improved gear checking apparatus in such full, clear, concise and exact terms as to enable any person skilled in the art to practice the invention, the scope of which is indicated by the appended claims.

What I claim as my invention is:

1. Fully automatic gear gauging and recording apparatus comprising: a base, a rotary gear support on said base, a gauge support on said base, gauging means on said gauge support comprising a pair of independently movable sensing elements spaced to engage simultaneously with a pair of oppositely facing tooth surfaces of a gear on said gear support, means mounting said supports on said base for relative movement comprising in sequence a gauging stroke parallel to the axis of said gear support, a movement radially outwardly of said gear support into clearance, an idle return stroke parallel to the axis of said gear support, and a movement radially inwardly of said gear support to locate said sensing elements in position for the next gauging stroke, means for indexing said gear support during said idle return stroke, drive means connected to said supports and index means to repeat the series of relative movements between said supports and index movements of said gear support to gauge a predetermined number of teeth on a work gear, a recorder comprising a record tape and means for advancing the tape in timed relation to relative movement between said supports during each gauging stroke, a pair of recording elements each movable on the tape during advance thereof in accordance with movement of one of said sensing elements during each gauging stroke in a direction transverse to the direction of tape advance to produce on said tape a series of pairs of generally parallel lines in which corresponding lines of all pairs are in general alignment longitudinally of the tape to provide a visible record as to thickness, taper, lead and form of each gear tooth, and providing for ready comparison of these characteristics throughout the series of teeth.

2. Apparatus as defined in claim 1 which comprises lead bar mechanism connected between said rotary gear support and index means, and said gauge support, to rotate said gear support during gauging and idle return strokes in accordance with the helix angle of a work gear, and means for actuating said index means during the rotation of said gear support during an idle return stroke.

3. Apparatus as defined in claim 1 in which the drive means comprises a cam shaft having cams thereon to operate the index mechanism and provide the relative movement between said supports into and out of clearance, a second shaft and mechanism driven thereby to provide the relative movement between said supports in gauging and idle return strokes, and means for driving said shafts continuously in timed relation throughout the gauging of the predetermined number of teeth of a work gear.

References Cited in the file of this patent

UNITED STATES PATENTS

| | | |
|---|---|---|
| 1,254,062 | Olson | Jan. 22, 1918 |
| 1,588,963 | Harter | June 15, 1926 |
| 2,046,506 | Drader | July 7, 1936 |
| 2,108,414 | Schurr | Feb. 15, 1938 |
| 2,206,852 | Poupitch | July 2, 1940 |
| 2,261,093 | Poupitch | Oct. 28, 1941 |
| 2,563,000 | Bean | Aug. 7, 1951 |
| 2,621,556 | Beardsley | Dec. 16, 1952 |
| 2,640,272 | Bean | June 2, 1953 |
| 2,648,912 | Osgood | Aug. 18, 1953 |
| 2,775,041 | Pomernacki | Dec. 25, 1956 |
| 2,807,175 | Tandler | Sept. 24, 1957 |
| 2,846,773 | Carlson | Aug. 12, 1958 |
| 2,914,861 | Flair | Dec. 1, 1959 |

FOREIGN PATENTS

| | | |
|---|---|---|
| 379,854 | Germany | Aug. 30, 1923 |
| 715,302 | England | Sept. 8, 1954 |